Patented Nov. 5, 1940

2,220,386

UNITED STATES PATENT OFFICE 2,220,386

METHOD OF MANUFACTURING SHEET ASBESTOS PRODUCTS

Marion S. Badollet, Fanwood, N. J., assignor to Johns-Manville Corporation, New York, N. Y., a corporation of New York No Drawing. Application December 23, 1936, Serial No. 117,343

5 Claims. (Cl. 92—21)

This invention relates to an asbestos product and the method of making the same, particularly to the method of increasing the freeness of asbestos fibres.

The invention is especially applicable to the making of asbestos paper or millboard or asbestos cement sheets. In making such products, there has been difficulty because of the slowness of filtration of the water through the sheet as the sheet is being formed, because of waste of very fine fibres through the filtering support upon which the sheet is formed, and because of the difficulty of settling of such fine waste fibres for recovery from the save-all tanks.

It is an object of the invention to overcome these disadvantages in conventional manufacturing methods. In one embodiment of the invention it is an object, also, to provide a pigmented asbestos product in which the pigment is not susceptible to being removed by washing with water or light rubbing. Other objects and advantages will appear from the detailed description that follows.

In general, the invention comprises the product resulting from and the method of treating wet asbestos fibres with a freeness-increasing agent and then forming a sheet asbestos product, the method of formation including the separation of water by movement past the asbestos fibres or through a felt thereof, as by filtration through a sheet of such fibres, as the sheet is being formed.

The invention will be more specifically illustrated by description in connection with the making of asbestos products by the use of the cardboard or millboard machine and method described in U. S. Reissue Patent 12,594, issued to Hatschek on January 15, 1907, the method being modified as recited herein.

Asbestos fibres and water and a cement, if desired as binder, are made into an intimate mixture and formed into a sheet as described in the said patent to Hatschek, except that there is incorporated into the mixture a small proportion of the freeness-increasing agent.

As the freeness-increasing agent or coagulating agent, I use a material that causes agglomeration of the finer particles of asbestos fibres into larger and more free units, that is, into units increasing substantially the rate of filtration of water, through a sheet containing such units, over the rate of filtration of a sheet that is comparable except for containing the fines in unagglomerated form. The said agent should be one adapted to lower the surface tension of water and to become intimately associated with the asbestos fibres, as by being concentrated thereover or impregnated thereinto, when the fibres are treated with an aqueous composition including the said agent intimately mixed with a large volume of water. I prefer to use a material that also forms a thin oily film over the fibres.

The freeness-increasing agent selected should be free from reaction of an objectionable nature upon the asbestos fibres. There should be avoided materials that cause heavy precipitation with calcium or magnesium salts.

Of the various kinds of asbestos, chrysotile fibres are unique in their action with the freeing agent. However, other asbestos fibres may be treated as described herein. Thus, there may be used for some purposes crocidolite or tremolite in fibrous form.

Suitably, also, there is used a conventional foam-reducing material such as a high-boiling petroleum oil or other water-insoluble oily product. Thus, there may be used a mineral seal oil. When such antifoaming material is used, there may be used a freeness-reducing agent of the kind described or sulfonated sperm oil. Thus, I have used to advantage a composition made by sulfonating a mixture of sperm and mineral seal oil.

Examples of freeness-increasing agents of the general properties described are the sulfonated oils, as, for example, sulfonated castor oil of the grade commonly known as Turkey red oil and Twitchell's reagent.

Among the other agents that may be used are various oily products that lower the surface tension of water, as, for example, the product sold under the trade name Igepon, and, for some purposes, the sulfonation products of complex olefins of high boiling point and of the higher alcohols, such as the products sold under the trade name Gardinol or Duponol. Igepon is an organic composition in which the basic ingredient is an oleic acid ester of a sulphonated aliphatic compound and Gardinol and Duponol are organic compounds in which the basic ingredients are sulphonated higher alcohol.

The composition from which the asbestos sheet product is to be formed may include chrysotile asbestos fibres of grade commonly used in the manufacture of asbestos cement shingles, Portland cement, and about one-half part of the freeness-increasing agent, say 0.2 to 1% of the said agent on the weight of the asbestos fibres. The proportion of cement used may be one that is now used in making asbestos cement sheets or shingles, say one-third to two parts for one part by weight of the asbestos.

This composition, after being made intimate, may be flowed into the filtering bed of a hydraulic press, such as commonly employed in the making of strongly compressed asbestos cement sheets. The ram of the hydraulic press is brought down on the composition, to shape it into a sheet and express therefrom a major proportion of the water by filtration through the sheet at relatively low pressure. Thereafter, the shaped product is subjected to high pressure to strongly compress and densify the product, say at a maximum pressure of 1,000 to 2,000 pounds to the square inch. In a modified procedure of forming the sheeted product, the composition may be formed into a sheet on a cardboard machine as described in Hatschek patent reissue No. 12,594.

The effect of the freeness-increasing agent is particularly pronounced during the filtration at low pressure. Thus, in typical experiments using vacuum as the sole source of the pressure differential on the two sides of the aqueous composition being formed into a sheet, I have found times of filtration, measured in manners that are comparable, to be as much as 80% longer when no freeness-increasing agent is used than the period required when there is used such agent as described. It is evident therefore, that the freeing agent increases greatly the rate of filtration of water through an asbestos sheet product including the said agent.

In place of the Portland cement described, there may be used another hydraulic cementitious material, as, for example, a calcium aluminate cement such as cement fondu or, for some purposes, plaster.

When it is desired, the cementitious material is omitted and a sheet of paper or millboard or the like is formed from a composition comprising a dilute aqueous suspension of asbestos fibres, the freeness-increasing agent, and suitably also a small proportion of conventional binder for asbestos fibres in paper form, as, for instance, starch or the like used in the proportion of a few per cent of the dry weight of the asbestos fibres.

The freeness-increasing agent may be used also in recovering from save-all tanks the asbestos fines that have passed through the filtering members upon which the asbestos sheet product has been formed. Thus, the agent, in the proportion described, may be added to the aqueous suspension of the very fine asbestos fibres that have passed through the screen of the papermaking or cardboard-making machine or asbestos cement press and have been collected in a save-all tank. The freeness-increasing agent promotes flocculation or coagulation of the fines of asbestos into larger units that are then recovered by settling and/or filtration. Or, the aqueous mixture from the save-all tank, including the coagulated fibres, may be used to replace water and some fibres in a fresh batch of materials for making the asbestos product.

While the invention is not limited to any theory of explanation of the results obtained, it is believed that an important part of the effect of the freeness-increasing agent of preferred type is a reaction by which the said agent is firmly fixed to the asbestos fibres, as by chemical reaction therewith. Thus, a sulfonated oily material may react to a large extent with a compound of magnesium or other metallic component of asbestos.

When it is desired to form a colored asbestos product, then the process and compositions above described are used with the exception that the selected pigment or pigments is intimately mixed with the freeness-increasing agent, such as one of the sulfonated materials described above, preferably shortly before the said agent is formed into the aqueous composition with the asbestos fibres. Such colored fibres may be used as decorative asbestos.

It will be understood that the details given are for the purpose of illustration, not restriction, and that variations within the spirit of the invention are to be included in the scope of the appended claims.

What I claim is:

1. The method of maufacturing an asbestos product in sheet form which comprises forming an intimate mixture of asbestos fibres, water and a coagulating agent of the group consisting of sulphonated oils, sulphonated alcohols and sulphonated olefins in the amount of .2% to 1% based on the weight of the asbestos fibres, said coagulating agent causing agglomeration of the fine asbestos fibres, then forming a sheet from the material and removing water therefrom by filtration.

2. The method of manufacturing an asbestos product in sheet form which comprises forming an intimate mixture of asbestos fibres, water and a coagulating agent of the group consisting of sulphonated oils, sulphonated alcohols and sulphonated olefins in the amount of .2% to 1% based on the weight of the asbestos fibres, said coagulating agent causing agglomeration of the fine asbestos fibres, then forming a sheet from the material and removing water therefrom by filtration at a pressure differential on two sides of the sheet that is low.

3. The method of manufacturing an asbestos product in sheet form which comprises forming an intimate mixture of asbestos fibres, a hydraulic cementitious material, water and a coagulating agent of the group consisting of sulphonated oils, sulphonated alcohols and sulphonated olefins in the amount of .2% to 1% based on the weight of asbestos fibres, said coagulating agent causing agglomeration of the fine asbestos fibres, then forming a sheet from the material and removing water therefrom by filtration.

4. The method of manufacturing an asbestos product in sheet form which comprises forming an intimate mixture of asbestos fibres and water, subjecting the mixture to treatment with a coagulating agent of the group consisting of sulphonated oils, sulphonated alcohols and sulphonated olefins in the amount of .2% to 1% based on weight of asbestos fibres, said coagulating agent causing agglomeration of the fine asbestos fibres into larger units, then collecting the asbestos on a filtering medium and withdrawing water therefrom by filtration to form a sheeted product.

5. The method of manufacturing an asbestos product in sheet form, which comprises forming an intimate mixture of asbestos fibres, water and a coagulating agent of the group consisting of sulphonated oils, sulphonated alcohols and sulphonated olefins in the amount of .2% to 1% based on the weight of asbestos fibres, said coagulating agent causing lowering of the surface tension of the water and agglomeration of the fine asbestos fibres into larger units to increase the rate of filtration, then forming a sheet from the material and removing water therefrom by filtration.

MARION S. BADOLLET.